US008773407B2

(12) United States Patent
Park

(10) Patent No.: US 8,773,407 B2

(45) Date of Patent: Jul. 8, 2014

(54) DRIVING DEVICE OF DISPLAY DEVICE AND DRIVING METHOD THEREOF

(75) Inventor: Jong-Hyon Park, Cheonan-si (KR)

(73) Assignee: Samsung Display Co., Ltd., Yongin, Gyeonggi Do (KR)

( * ) Notice: Subject to any disclaimer, the term of this patent is extended or adjusted under 35 U.S.C. 154(b) by 1149 days.

(21) Appl. No.: 12/186,697

(22) Filed: Aug. 6, 2008

(65) Prior Publication Data

US 2009/0109133 A1 Apr. 30, 2009

(30) Foreign Application Priority Data

Oct. 29, 2007 (KR) ........................ 10-2007-0108747

(51) Int. Cl.
*G06F 3/038* (2013.01)

(52) U.S. Cl.
USPC ............... 345/204; 345/89; 345/87; 345/698; 375/E7.211

(58) Field of Classification Search
None
See application file for complete search history.

(56) References Cited

U.S. PATENT DOCUMENTS

| | | | | |
|---|---|---|---|---|
| 5,164,819 | A * | 11/1992 | Music | 375/240.24 |
| 6,130,911 | A * | 10/2000 | Lei | 375/240.16 |
| 6,160,900 | A | 12/2000 | Miyawaki et al. | |
| 6,256,347 | B1 | 7/2001 | Yu et al. | |
| 6,983,017 | B2 | 1/2006 | Chen et al. | |
| 2002/0030652 | A1* | 3/2002 | Shibata et al. | 345/87 |
| 2003/0058228 | A1* | 3/2003 | Katoh et al. | 345/204 |
| 2005/0057471 | A1* | 3/2005 | Lu et al. | 345/89 |
| 2006/0038759 | A1* | 2/2006 | Hong et al. | 345/87 |
| 2007/0222724 | A1 | 9/2007 | Ueno et al. | |
| 2008/0001975 | A1* | 1/2008 | Obara | 345/694 |

FOREIGN PATENT DOCUMENTS

| | | |
|---|---|---|
| CN | 1497985 | 5/2004 |
| CN | 1498493 | 5/2004 |
| CN | 1762149 | 4/2006 |
| CN | 1946181 | 4/2007 |
| CN | 101056412 | 10/2007 |
| JP | 01-112377 | 5/1989 |
| JP | 05-064000 | 3/1993 |
| JP | 2000-244935 | 9/2000 |
| JP | 2001-008209 | 1/2001 |
| JP | 2004-222142 | 8/2004 |
| JP | 2005-072847 | 3/2005 |
| JP | 3680922 | 5/2005 |
| JP | 2006-047993 | 2/2006 |
| JP | 2006-267172 | 10/2006 |

(Continued)

*Primary Examiner* — Jesus Hernandez
(74) *Attorney, Agent, or Firm* — F. Chau & Associates, LLC

(57) ABSTRACT

A driver for pixels of a display, having pixels arranged into a plurality of pixel blocks including at least two pixels in a row and at least two pixels in a column is presented. The driver includes a first converter, a second converter, and a frame memory. The first converter receives input image signals for a pixel block of the plurality of pixel blocks and generates compressed image signals by compressing the input image signals based on compression reference image signals. The frame memory stores the compressed image signals. The second converter reads the compressed image signals from the frame memory, and restores the compressed image signals based on compression reference image signals to generate restoration image signals. A compression reference image signal for a first pixel of the pixel block is the restoration image signal for a second pixel of a neighboring pixel block. Compression reference image signals for the remaining pixels in the pixel block are restoration image signals for different pixels in the pixel block.

20 Claims, 7 Drawing Sheets

(56) References Cited

FOREIGN PATENT DOCUMENTS

| | | |
|---|---|---|
| JP | 2006-295804 | 10/2006 |
| JP | 2006-332955 | 12/2006 |
| JP | 2006-345321 | 12/2006 |
| KR | 1020010059114 | 7/2001 |
| KR | 1020010087647 | 9/2001 |
| KR | 1020020027781 | 4/2002 |
| KR | 100366937 | 12/2002 |
| KR | 1020050077454 | 8/2005 |
| KR | 100571814 | 4/2006 |
| KR | 1020060127668 | 12/2006 |
| KR | 1020070032111 | 3/2007 |

* cited by examiner

DRIVING DEVICE OF DISPLAY DEVICE AND DRIVING METHOD THEREOF

CROSS-REFERENCE TO RELATED APPLICATION

This application claims priority to Korean Patent Application No. 10-2007-0108747, filed on Oct. 29, 2007, the disclosure of which is incorporated by reference herein.

BACKGROUND OF THE INVENTION (a) Technical Field

The present disclosure relates to a driving device for a display device and a driving method thereof.

(b) Discussion of Related Art

A display device may include a plurality of pixels arranged in matrix shape. The luminance of each pixel is controlled according to given image information to display images.

The display device receives external image signals and stores them to a frame memory. The image signals may be modified to be suitable for a display panel of the display device. The size of the frame memory and the number thereof may be increased according to an increase in the size of the display panel or the number of the image signals to be stored. Accordingly, the number of data transmission lines that are needed for writing the image signals to the frame memory and reading the stored image signal is increased.

Techniques for compressing the image signals and restoring the compressed images need to be developed for inputting and outputting a large amount of image information to a frame memory through a limited number of data transmission lines. However, compressed signals may not properly represent the original image information when there is not enough time available to properly compress the image signals.

Liquid crystal displays have been widely used as display screens for televisions and personal computers. However, the liquid crystals of conventional liquid crystal displays have a slow response speed, thereby making it difficult to display motion pictures. Further, a conventional liquid crystal display is a hold type, which can cause a blurring phenomenon or clouded image when a motion picture is displayed.

Thus, there is a need for a liquid crystal display with a higher liquid crystal response speed and methods thereof which can compress image signals more quickly.

SUMMARY OF THE INVENTION

A driver for pixels of a display according to an exemplary embodiment of the present invention includes a first converter, a frame memory, and a second converter. The pixels are arranged into a plurality of pixel blocks including at least two pixels in a row and at least two pixels in a column. The first converter receives input image signals for a plurality of pixels arranged in a matrix shape, and generates compressed image signals by compressing the input image signals based on compression reference image signals. The frame memory stores the compressed image signals. The second converter reads the compressed image signals from the frame memory and restores the compressed image signals based on compression reference image signals to generate restoration image signals. A compression reference image signal for a first pixel of the pixel block is the restoration image signal for a second pixel in a neighboring pixel block. Compression reference image signals for the remaining pixels in the pixel block are the restoration image signals for different pixels in the pixel block.

The pixel block may be a pixel matrix with a square shape. The first pixel and the second pixel may be adjacent to each other. The compressed image signals may be generated by subtracting the first compression reference signals from the input image signals. The adjacent pixel blocks may be adjacent pixel blocks in a row direction. The adjacent pixel blocks may be adjacent pixel blocks in a column direction. The driving device may further include a signal compensator to compensate the second restoration image signals.

A driving device for a display device according to an exemplary embodiment of the present invention includes a first storage unit, a first converter, a frame memory, and a second converter. The first storage unit receives input image signals sequentially transmitted according to a clock signal, stores the input image signals for at least four pixel rows, and simultaneously outputs the input image signals for at least two of the four pixel rows. The first converter compresses the input image signals received by a first storage unit based on first compression reference image signals to generate compressed image signals, and restores the compressed image signals to generate first restoration image signals. The frame memory stores the compressed image signals. The second converter reads the compressed image signals from the frame memory, and restores the compressed image signals based on second compression reference image signals to generate second restoration image signals.

The time for compressing the input image signals through the first converter may be greater than one period of the clock signal. The first storage unit may include a first input section, first, second, and third row memories, and a first output section. The first input section groups input image signals input in series row by row to sequentially output the input image signals to a plurality of output terminals. The first, second, third, and fourth row memories are respectively connected to the output terminals of the input section, and respectively store the input image signals of one row. The first output section simultaneously outputs the input image signals stored in the first and second row memories, and simultaneously outputs the input image signals stored in the third and fourth row memories.

The first storage unit may further include a second output section sequentially outputting the input image signals stored in the first to fourth row memories. The driving device may further include a first calculator, a second calculator, and a signal compensator. The first calculator calculates a difference between the first restoration image signals and the second restoration image signals to generate difference signals. The second calculator generates second restoration image signals based on the difference signals and the input image signals received from the second output section. The signal compensator compensates the input image signals received from the second output section based on the second restoration image signals. The driving device may further include a second storage unit to receive and store the difference signals from the first calculator and output them to the second calculator. The second storage unit may include four row memories.

The compressed image signals may be generated by a pixel block. The pixel block may include at least two pixels in a row and at least two pixels in a column. The first compression reference image signals for one pixel among the pixels included in the pixel block may be the first restoration image signals for one pixel included in a neighboring pixel block in a row direction, and the first compression reference image signals for the remaining pixels of the pixel block may be the first restoration image signals for different pixels in the pixel block.

A driving device for a display device according to an exemplary embodiment of the present invention includes a first storage unit, a second storage unit, a first converter, a frame memory, and a second converter. The first storage unit stores input image signals according to a clock signal. The second storage unit stores first compression reference image signals. The first converter generates compressed image signals by compressing the input image signals received from the first storage unit based on the first compression reference image signals received from the second storage unit and generates first restoration image signals by restoring the compressed image signals, and stores a portion of the first restoration image signals in the second storage unit as first compression reference image signals. The frame memory stores the compressed image signals. The second converter reads the compressed image signals from the frame memory and restores the compressed image signals based on the second compression reference image signals to generate second restoration image signals.

The first compression reference image signals stored to the second storage unit by the first converter may be used to compress the input image signals of a next row. The memory capacity of the second storage unit may be half that of the memory capacity of the first storage unit.

The driving device may further include a third storage unit to store the second compression reference image signals. The second converter may generate second restoration image signals based on the second compression reference image signals stored in the third storage unit and store a portion of the second restoration image signals in the third storage unit as the second compression reference image signals.

The driving device may further include a first calculator, a second calculator, and a signal compensator. The first calculator calculates the difference between the first restoration image signals and the second restoration image signals to generate difference signals. The second calculator generates second restoration image signals based on the difference signals and the input image signals received from the second output section. The signal compensator compensates the input image signals received from the second output section based on the second restoration image signals.

The driving device may further include a buffer memory to receive the restoration image signals from the frame memory to output the restoration image signals to the second converter after storing and delaying by a row unit. The driving device may further include a row memory to receive and store the restoration image signals from the second converter and output the restoration image signals to the second calculator.

A driving method for a display device according to an exemplary embodiment of the present invention includes receiving input image signals for a plurality of pixels arranged in a matrix shape, generating compressed image signals by compressing the input image signals based on first compression reference image signals and generating first restoration image signals by restoring the compressed image signals, storing the compressed image signals, and generating second restoration image signals by restoring the stored compressed image signals based on second compression reference image signals. The compressed image signals are generated by a pixel block that includes at least two pixel rows and at least two pixel columns. The first compression reference image signals for a first pixel in the pixel block are the first restoration image signals for a second pixel in a neighboring pixel block. The first compression reference image signals for the remaining pixels in the pixel block are the first restoration image signals for different pixels in the corresponding pixel block.

The pixel block may be a pixel matrix with a square shape. The first pixel and the second pixel may be adjacent to each other. The compressed image signals may be generated by subtracting the first compression reference signals from the input image signals. The adjacent pixel blocks may be adjacent pixel blocks in a row direction.

The generating of the compressed image signals and the first restoration image signals may include sequentially storing the input image signals transmitted with a first frequency to a plurality of row memories, and generating compressed image signals and first restoration image signals for the input image signals of two rows by simultaneously reading the input image signals of two rows from the plurality of row memories with a second frequency being half of the first frequency.

A driving method for a display device according to an exemplary embodiment of the present invention includes generating compressed image signals and preceding restoration image signals for input image signals for a first frame based on predetermined stored compression reference image signals, storing a portion of the preceding restoration image signals as compression reference image signals for different input image signals, storing the compressed image signals to a frame memory, and generating following restoration image signals by reading and restoring the compressed image signals from the frame memory. The generating of the compressed image signals and the preceding restoration image signals includes storing a first one of the input image signals to a row memory, compressing and restoring the first one of the input image signals stored in the row memory and a second one of the input image signals input. The portion of the stored preceding restoration image signals is used as compression reference image signals for a third one of the input image signals.

The input image signals may include first and second input image signals, the compressed image signals may include first and second compressed image signals respectively corresponding to the first and second input image signals, the preceding restoration image signals may include first and second preceding restoration image signals respectively corresponding to the first and second input image signals. The generating of the compressed image signals and the first restoration image signals may include reading the stored compression reference image signals, generating the first compressed image signals by calculating a difference between the first input image signals and the read compression reference image signals, generating the first preceding restoration image signals by restoring the first compressed image signals, generating the second compressed image signals by compressing the second input image signals based on the first preceding restoration image signals, and generating the second preceding restoration image signals by restoring the second compressed image signals. The portion of the second preceding restoration image signals may be stored as the compression reference image signals for the third one of the input image signals.

The driving method may further include receiving the input image signals of the second frame and compensating the input image signals of the second frame based on the the following restoration image signals.

The compensating of the input image signals may include generating the preceding restoration image signals of the second frame from the input image signals of the second frame, generating difference signals by calculating differences between the following restoration image signals of the first frame and the preceding restoration image signals of the second frame, generating second restoration image signals of the first frame from the difference signals and the input image signals of the second frame, and generating the compensation image signals by compensating input image signals of the second frame according to the second restoration image signals.

The second restoration image signals of the first frame may be obtained by a sum of the difference signals and the input image signals of the second frame.

A driver for pixels of a display according to an exemplary embodiment of the present invention, the pixels arranged into a plurality of pixel blocks comprising at least four pixels in at least two rows and at least two columns, which includes a first converter, a second converter, and a frame memory, wherein the first converter compresses a first image signal for a first pixel of a pixel block of the plurality of pixel blocks based on a first reference signal to generate a first compressed image signal for storage in the frame memory, wherein the second converter reads the first compressed image signal from the frame memory and generates a first restoration image signal from the first compressed image signal and the first reference signal, wherein the first converter compresses a second image signal for a second pixel of the pixel block based on the first restoration image signal to generate a second compressed image signal for storage in the frame memory, wherein the first converter compresses a third image signal for a third pixel of the pixel block based on the first restoration image signal to generate a third compressed image signal for storage in the frame memory, wherein the second converter reads the second and third compressed image signals from the frame memory, generates a second restoration image signal from the second compressed image signal and the first restoration image signal, generates a third restoration image signal from the third compressed image signal and the first restoration image signal, and wherein the first converter compresses a fourth image signal for a fourth pixel of the pixel block based an average of the second and third restoration image signals.

DETAILED DESCRIPTION OF EXEMPLARY EMBODIMENTS

Figure 1:
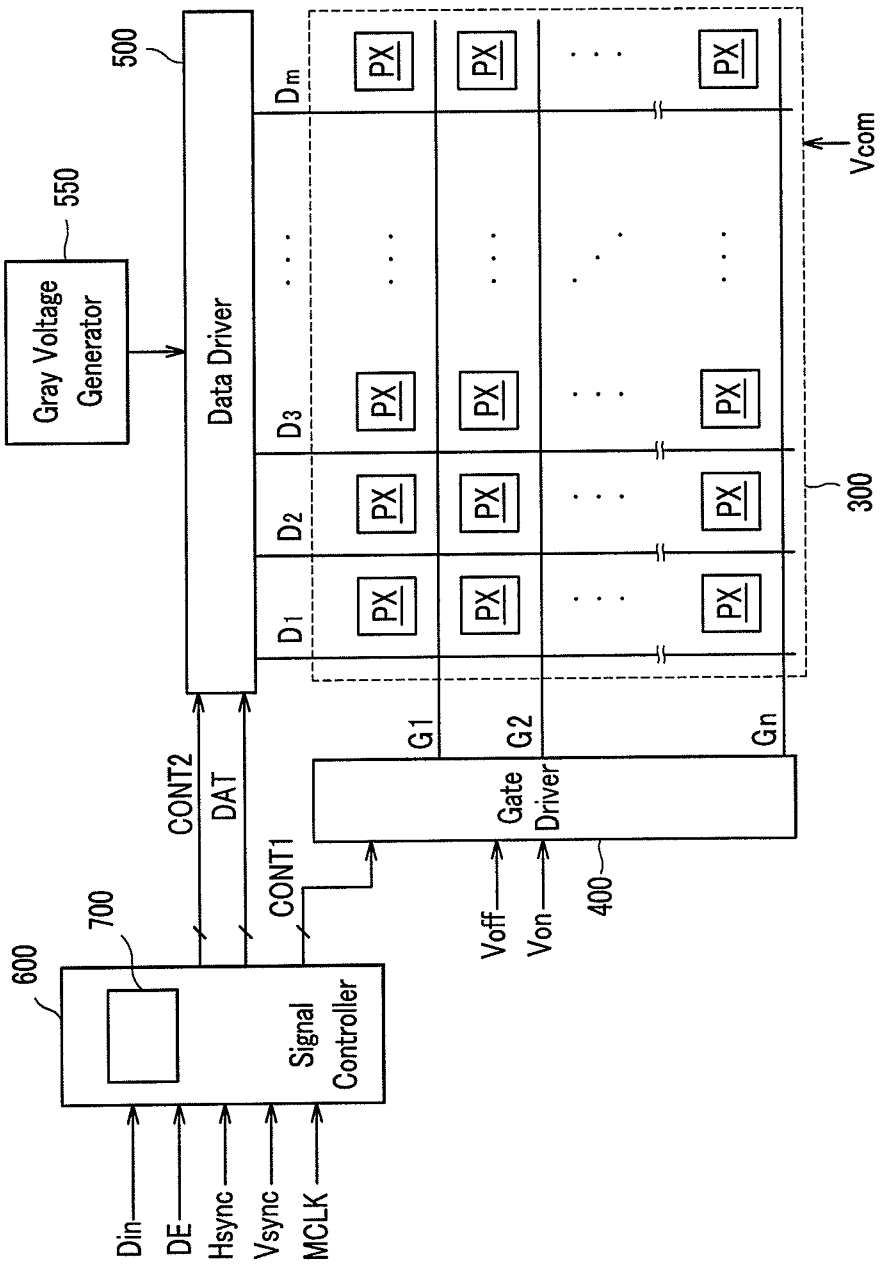
FIG. 1 is a block diagram of a liquid crystal display according to an exemplary embodiment of the present invention.
Figure 2:
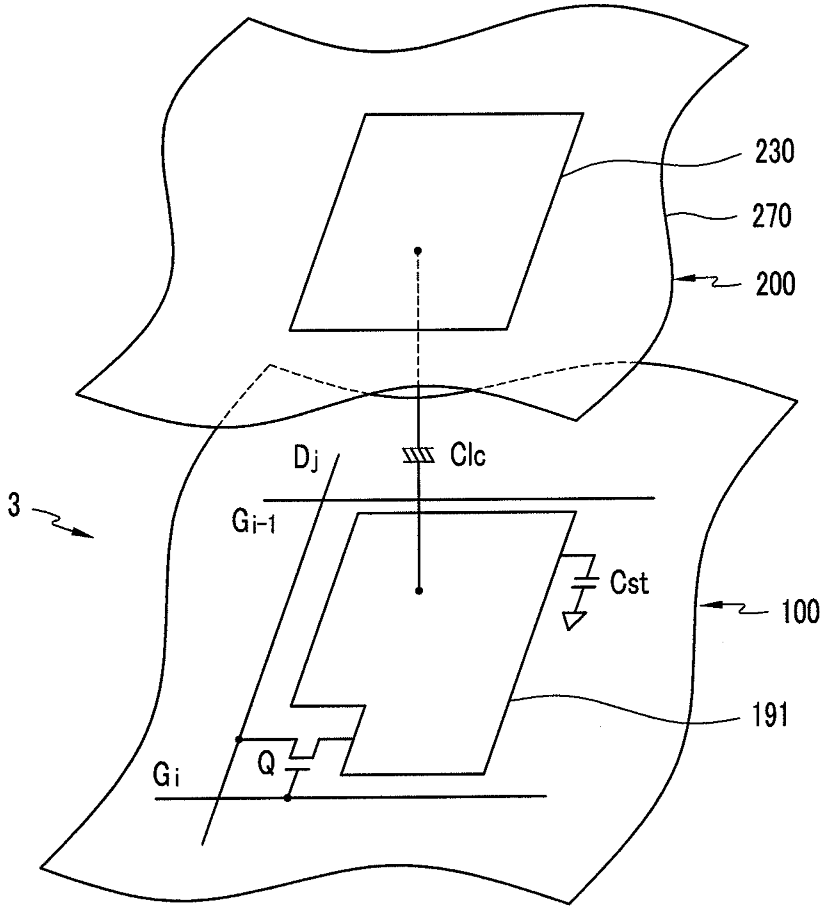
FIG. 2 is an equivalent circuit diagram of a pixel in a liquid crystal display according to an exemplary embodiment of the present invention.

Hereinafter, exemplary embodiments of the present invention will be described in detail with reference to the accompanying drawings. A display device according to an exemplary embodiment of the present invention will be described in detail with reference to FIGS. 1 and 2. FIG. 1 is a block diagram of a liquid crystal display according to an exemplary embodiment of the present invention, and FIG. 2 is an equivalent circuit diagram of two sub-pixels in a liquid crystal display according to an exemplary embodiment of the present invention.

As shown in FIG. 1, the liquid crystal display includes a liquid crystal panel assembly 300, a gate driver 400, a data driver 500, a gray voltage generator 550, and a signal controller 600.

The liquid crystal panel assembly 300 includes a plurality of signal lines $G_1$-$G_n$ and $D_1$-$D_m$, and a plurality of pixels PX that are connected to the plurality of signal lines $G_1$-$G_n$ and $D_1$-$D_m$ and are arranged in an approximate matrix shape. Referring to the structure shown in FIG. 2, the liquid crystal panel assembly 300 includes lower and upper display panels 100 and 200 that face each other, and a liquid crystal layer 3 that is interposed between the lower and upper display panels 100 and 200.

The signal lines $G_1$-$G_n$ and $D_1$-$D_m$ are provided in the lower panel 100, and include a plurality of gate lines $G_1$-$G_n$ that transmit gate signals (also referred to as "scanning signals"), and a plurality of data lines $D_1$-$D_m$ that transmit data signals. The gate lines $G_1$-$G_n$ extend substantially in a row direction and are parallel with one another, and the data lines $D_1$-$D_m$ extend substantially in a column direction and are parallel with one another.

Each pixel, for example a pixel PX connected to an i-th (i=1, 2, . . . n) gate line $G_i$ and a j-th (j=1, 2, . . . m) data line $D_j$, includes a switching device Q that is connected to a signal line ($G_i$, $D_j$), a liquid crystal capacitor Clc that is connected to the switching device Q, and a storage capacitor Cst. The storage capacitor Cst may be omitted if necessary.

The switching element Q is a device having three terminals included in the lower display panel 100, such as a thin film transistor. In the switching element Q, a control terminal is connected to a gate line $G_i$, an input terminal is connected to a data line $D_j$, and an output terminal is connected to the liquid crystal capacitor Clc and the storage capacitor Cst. The thin film transistor may include polysilicon or amorphous silicon.

The liquid crystal capacitor Clc has a pixel electrode 191 of the lower display panel 100 and a common electrode 270 of the upper display panel as two terminals. The liquid crystal layer 3 interposed between the two electrodes 191 and 270 functions as a dielectric. The pixel electrode 191 is connected to the switching device Q. The common electrode 270 is formed on the entire surface of the upper display panel 200, and a common voltage Vcom is applied to the common electrode 270. Although not shown in FIG. 2, the common electrode 270 may be included in the lower display panel 100. When the common electrode 270 is included in the lower display panel, at least one of the two electrodes 191 and 270 may be formed in the shape of a line or a bar.

The storage capacitor Cst serves as an auxiliary to the liquid crystal capacitor Clc. The storage capacitor Cst is formed as a separate signal line (not shown) on the lower panel 100 and the pixel electrode 191 overlaps it with an insulator interposed therebetween. A predetermined voltage such as the common voltage Vcom or the like is applied to the separate signal line. The storage capacitor Cst can be formed as the pixel electrode 191 overlaps with the immediately previous gate line at the middle of the insulator.

Each pixel PX can display one of the primary colors (e.g., spatial division), or the pixels PX can alternately display the primary colors over time (e.g., temporal division), respectively causing the primary colors to be spatially or temporally synthesized to display a desired color. The primary colors include colors such as red, green, and blue. FIG. 2 is an example of spatial division. As shown in FIG. 2, each of the pixels PX includes a color filter 230 representing one of the primary colors and that is disposed in a region of the upper display panel 200 corresponding to a pixel electrode 191. The color filter 230 may be formed above or below the pixel electrode 191 of the lower display panel 100. At least one polarizer (not shown) for polarizing light may be attached to an outer surface of the liquid crystal panel assembly 300.

Referring again to FIG. 1, the grayscale voltage generator 550 generates two grayscale voltage sets (or reference grayscale voltage sets) that are related to the transmittance of the pixels PX. One of the grayscale voltage sets has a positive value with respect to the common voltage Vcom, and the other has a negative value with respect to the common voltage Vcom. The number of gray voltages in one grayscale voltage set generated by the gray voltage generator 550 may be the same as the number of grays to be displayed by the liquid crystal display.

The data driver 500 is connected to the data lines $D_1$-$D_m$ of the display panel assembly 300, selects gray voltages supplied from the gray voltage generator 550, and then applies the selected gray voltages to the data lines $D_1$-$D_m$ as data voltages.

The gate driver 400 is connected to the gate lines $G_1$-$G_n$ of the display panel assembly 300 and synthesizes a gate-on voltage Von and a gate-off voltage Voff to generate gate signals, which are applied to the gate lines $G_1$-$G_n$.

The signal controller 600 controls the gate driver 400, the data driver 500, and includes a signal processor 700 that processes the input image signal Din. The driving devices 400, 500, 600, and 550 may be integrated with the liquid crystal panel assembly 300 along with the signal lines $G_1$-$G_n$ and $D_1$-$D_m$ and the switching elements Q. Alternatively, the driving circuits 400, 500, 600, and 550 may be directly mounted as at least one integrated circuit (IC) chip on the panel assembly 300 or on a flexible printed circuit film (not shown) in a tape carrier package (TCP) type, which is attached to the LC panel assembly 300, or may be mounted on a separated printed circuit board (not shown). Further, some or all of the driving circuits 400, 500, 600, and 550 may be integrated as a single chip. When some of the driving circuits are integrated as a single chip the rest may be located outside the single chip.

The signal controller 600 is supplied with input image signals Din and input control signals for controlling the display thereof from an external graphics controller (not shown). The input image signals Din contain luminance information for each pixel (PX). The luminance has a predetermined number of grays, such as $1024(=2^{10})$, $256(=2^8)$, or $64(=2^6)$. The input control signals include, for example, a vertical synchronization signal Vsync, a horizontal synchronization signal Hsync, a main clock signal MCLK, and a data enable signal DE.

The signal controller 600 processes the input image signals Din according to an operating condition of the liquid crystal panel assembly 300 based on the input image signals Din and the input control signals to generate an output image signal DAT, a gate control signal CONT1, and a data control signal CONT2. The signal controller may also generate a lighting control signal (not shown). The signal controller 600 sends the generated gate control signal CONT1 to the gate driver 400 and the generated data control signal CONT2 and the processed image signal DAT to the data driver 500.

The gate control signal CONT1 includes scan start signals STV for indicating the start of a scan, and at least one clock signal for controlling an output period of the gate-on voltage Von. The gate control signal CONT1 may further include an output enable signal OE for limiting a duration time of the gate-on voltage Von.

The data control signal CONT2 includes a horizontal synchronization start signal STH for indicating the initiation of a data transmission of the output image signal DAT for a group of pixels PX, a load signal LOAD for requesting application of data signals to the liquid crystal panel assembly 300, and a data clock signal HCLK. The data control signal CONT2 may further include a reverse signal RVS for inverting the voltage polarity of the data signal with respect to the common voltage Vcom (hereinafter, "voltage polarity of the data signal with respect to the common voltage" is abbreviated to "polarity of the data signal").

The data driver 500 receives digital image signals DAT for a group of pixels PX according to the data control signal CONT2 transmitted from the signal controller 600, and selects a grayscale voltage corresponding to each digital image signal DAT to convert the digital image signals DAT into analog data signals. The data driver 500 applies the converted analog data signals to corresponding data lines $D_1$ to $D_m$.

The gate driver 400 applies a gate-on voltage Von to the gate lines $G_1$ to $G_n$ according to the gate control signal CONT1 transmitted from the signal controller 600 to turn on switching devices Q connected to the gate lines $G_1$ to $G_n$. The data signals applied to the data lines $D_1$ to $D_m$ are applied to corresponding pixels PX through the turned-on switching devices Q.

A voltage difference between a voltage of the data signal applied to the pixels PX and the common voltage Vcom appears as a charged voltage (e.g., pixel voltage) of the liquid crystal capacitor Clc. Alignment of the liquid crystal molecules varies according to the magnitude of the pixel voltage to change the polarization of light passing through the liquid crystal layer 3. The transmittance of the light may be changed by a polarizer attached to the liquid crystal panel assembly 300 according to the change in the polarization, and accordingly the pixel PX represents the luminance that the gray of the image signal DAT displays.

The aforementioned operations may be repeatedly performed in units of one horizontal period (1H) to sequentially apply the gate-on voltages Von to all the gate lines $G_1$ to $G_n$, so that the data signals are applied to all the pixels PX. As a result, one or more frames of the image may be displayed. One horizontal period 1H is the same as one period of the horizontal synchronization signal Hsync and the data enable signal DE.

A next frame begins when a previous frame ends. A state of the reverse signal RVS applied to the data driver 500 is controlled so that the polarity of the data signal applied to each of the pixels is opposite to the polarity in the previous frame (e.g., frame inversion). Even in one frame, the polarity of the data signal flowing through a data line may be inverted (e.g., row inversion and dot inversion) according to the characteristics of the reverse signal RVS. Further, the polarities of the data signals applied to a pixel row may be different from each other (e.g., column inversion and dot inversion).

Figure 3:
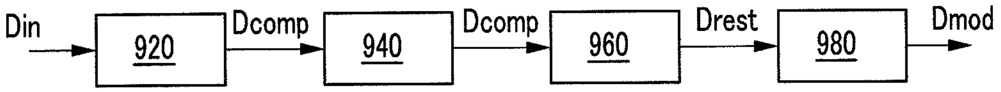
FIG. 3 is a block diagram of a signal processor in a liquid crystal display according to an exemplary embodiment of the present invention.
Figure 4:
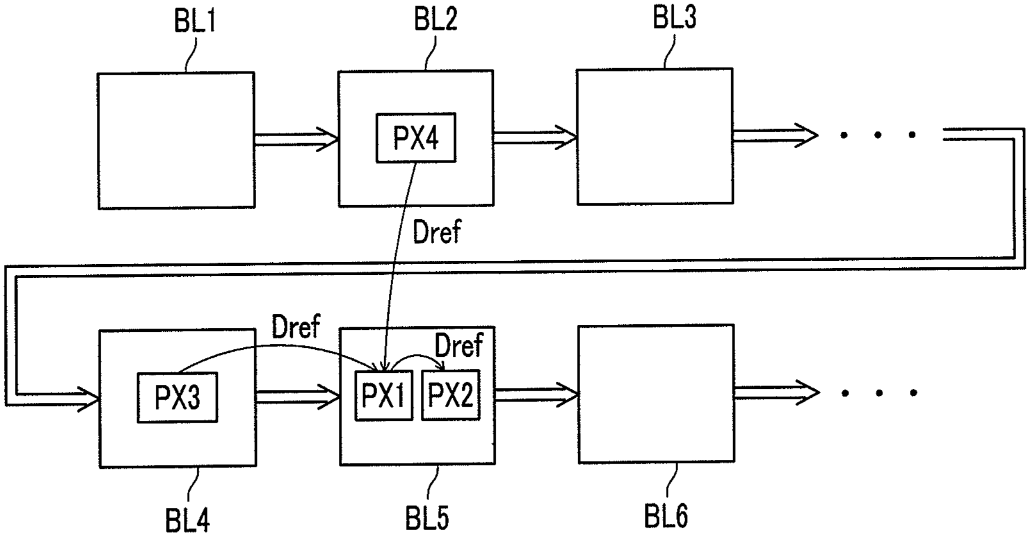
FIG. 4 is a view used for explaining a signal compression method of the signal processor shown in FIG. 3.

A signal processor according to an exemplary embodiment of the present invention will be described in detail with the reference to FIG. 3 and FIG. 4. FIG. 3 is a block diagram of a signal processor in a liquid crystal display according to an exemplary embodiment of the present invention, and FIG. 4 is a view used for explaining a signal compression method of the signal processor shown in FIG. 3.

Referring to FIG. 3, the signal processor includes a first converter 920, a frame memory 940, a second converter 960, and a signal compensator 980. The first converter 920 receives the input image signals Din for a plurality of row pixels and compresses them to generate compressed image signals Dcomp. The second converter 960 receives the compressed image signals Dcomp and restores them to generate restoration image signals Drest.

The compression method of the first converter 920 may be differential pulse code modulation (DPCM). In the DPCM method, pixels that are arranged with a matrix shape are grouped into a plurality of pixel blocks BL1-BL6, as shown in FIG. 4. Each of the blocks BL1-BL6 includes at least four pixels in at least two rows and at least two columns. The pixels may have a matrix arrangement, and preferably a square matrix. The pixel blocks BL1-BL6 may be arranged with a matrix shape.

The compressed image signal Dcomp for each pixel is generated by compressing the input image signals Din based on a compression reference image signal Dref. For example, the compressed image signals Dcomp may be defined by subtracting the compression reference image signals Dref from the input image signals Din according to Equation 1 as follows:

$$D\text{comp}=D\text{in}-D\text{ref}. \quad (1)$$

The compressed image signals Dcomp may be represented by a lesser number of bits than the input image signals Din because they only include information on differences between the image signals of the neighboring pixels. For example, a bit count of the compressed image signals Dcomp may be half that of a bit count of the input image signals Din.

The restoration image signals Drest are signals obtained through an opposite process to that of the compression. The restoration image signals Drest are generated by summing the compressed image signals Dcomp and the compression reference image signals Dref according to Equation 2 as follows:

$$D\text{rest}=D\text{comp}+D\text{ref}. \quad (2)$$

When Equation 2 is compared to Equation 1, it may appear that Drest=Din. However, a bit count of the image signals may be changed in the process of the compression and the restoration., Further, the restoration image signals Drest and the compressed image signals Dcomp may differ from each other. The restoration image signals for some pixels may be used in the generation of the compressed image signals Dcomp.

The compression reference image signals Dref for one pixel in each of the pixel blocks BL1-BL6 are the restoration image signals for one pixel included in the neighboring pixel blocks BL1-BL6, and the compression reference image signals Dref for the remaining pixels are the restoration image signals for the different pixels in their blocks BL1-BL6 or the signals with which the restoration image signals are calculated.

For example, in FIG. 4, the compression reference image signals Dref for the pixel PX1 in the pixel block BL5 are the restoration image signals for one pixel PX3 of the neighboring pixel block BL4 in the row direction, or the restoration image signals for the pixel PX4 of the neighboring pixel block BL2 in the column direction. Further, the compression reference image signals Dref for the pixel PX2 may be the restoration image signals for a neighboring pixel PX1 in the same pixel block BL5.

This compression process is sequentially executed by row of the pixel block as shown in FIG. 4, and is sequentially executed by pixel block in one pixel block row. When the compression reference image signals Dref are the restoration image signals for a neighboring pixel block in the column direction, the compression process has sufficient time as compared to when the compression reference image signals Dref are the restoration image signals for a neighboring pixel block in the row direction. For example, in FIG. 4, the compressions of the different pixel blocks BL3 and BL4 are performed after the compression for the pixel block BL2 but before the compression for the pixel block BL5. However, because the compressions for the pixel block BL4 and the pixel block BL5 are sequentially executed, it is beneficial to use the restoration image signals for the pixel block BL2 as the compression reference image signals Dref for the pixel block BL5 from a temporal point of the view.

The frame memory 940 receives and stores the compressed image signals Dcomp through data transmission lines from the first converter 920. The amount of storage space of the frame memory 940 and the number of data transmission lines can be reduced as compared to when no compression is used because the number of bits of the compressed image signals Dcomp is less than the number of bits of the input image signals Din.

The second converter 960 restores the compressed image signals Dcomp stored in the frame memory 940 to generate the restoration image signals Drest. The restoration image signals Drest are made with substantially the same method as the first converter 920 uses to make the restoration image signals Drest for generating the compressed image signals Dcomp.

The signal compensator 980 receives the restoration image signals Drest from the second converter 960, appropriately compensates them to generate compensation image signals Dmod, and outputs the compensation image signals Dmod.

Figure 5:
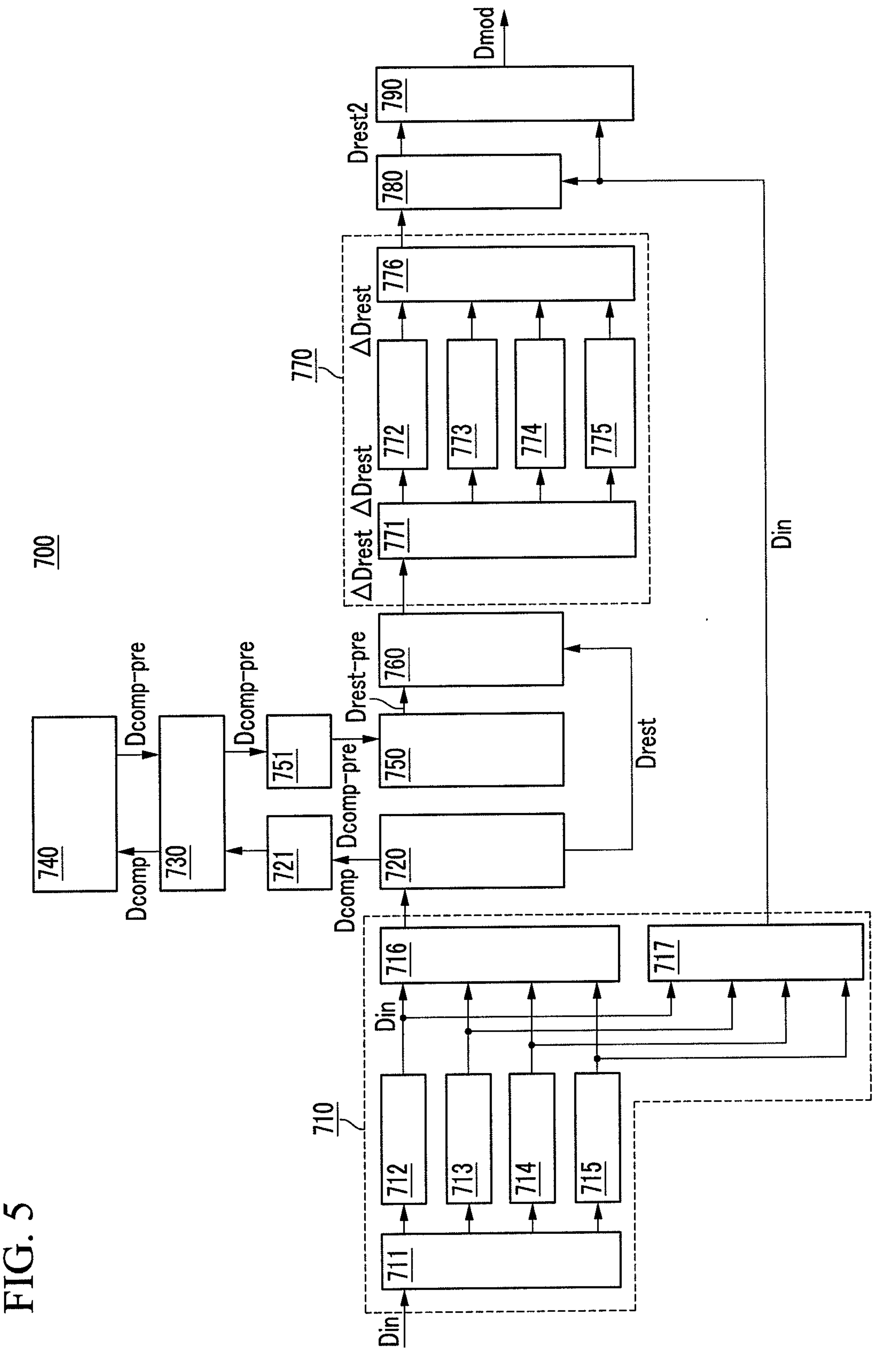
FIG. 5 is a block diagram of a signal processor in a liquid crystal display according to an exemplary embodiment of the present invention.
Figure 6:
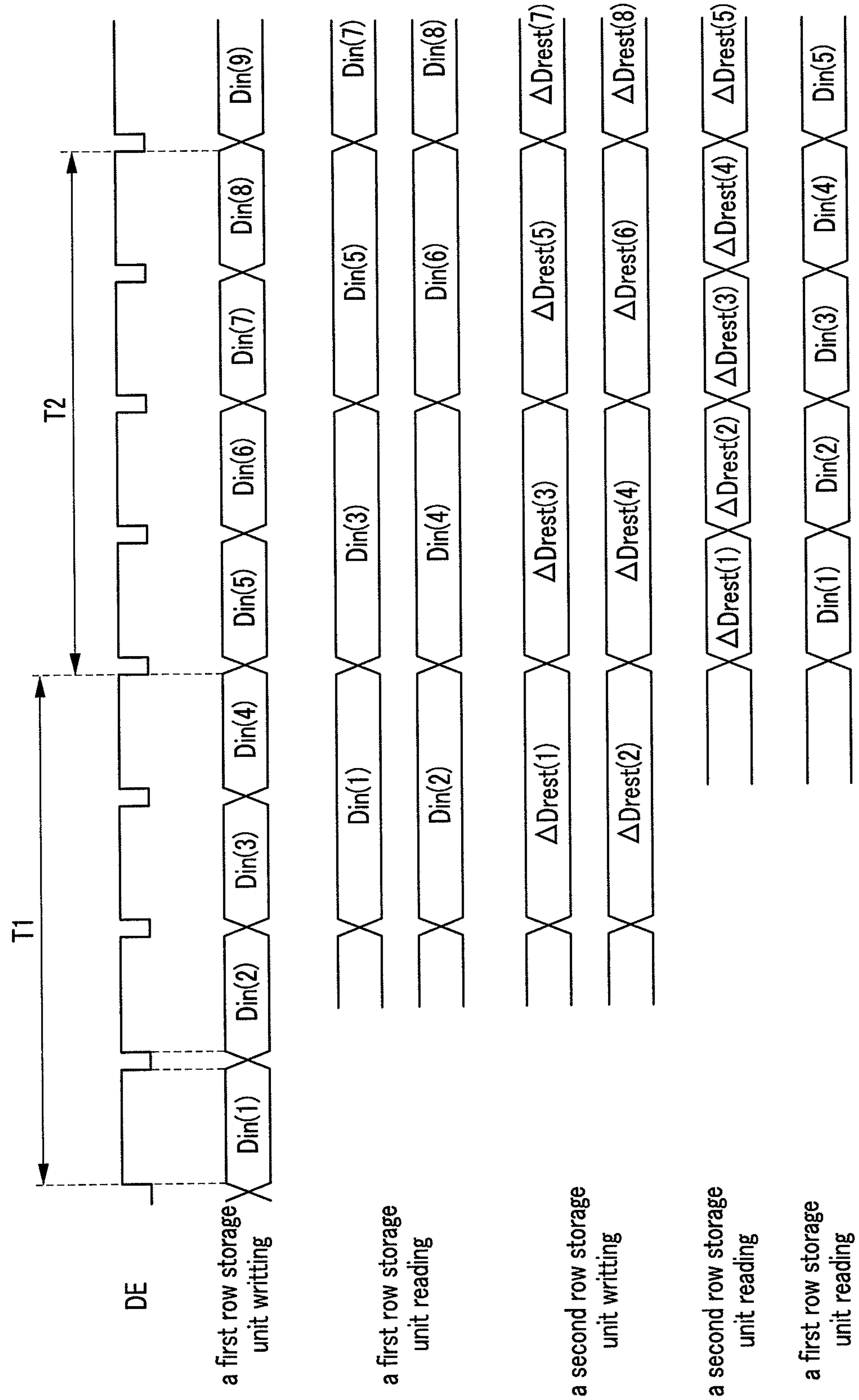
FIG. 6 is a signal waveform diagram used for explaining an operation of the signal processor of FIG. 5.

A signal processor according to an exemplary embodiment of the present invention will be described in detail with reference to FIG. 5 and FIG. 6. FIG. 5 is a block diagram of a signal processor in a liquid crystal display according to an exemplary embodiment of the present invention, and FIG. 6 is a signal waveform diagram of the signal processor shown in FIG. 5.

Referring to FIG. 5, the signal processor 700 includes a first storage unit 710, a first converter 720, a frame memory 740, a frame memory controller 730, a second converter 750, a first calculator 760, a second storage unit 770, a second calculator 780, a DCC processor 790, and buffer memories 721 and 751.

The first storage unit 710 includes a first input section 711, a plurality of memories 712, 713, 714, 715, a first output section 716, and a second output section 717.

The first input section 711 includes an input terminal and a plurality of output terminals, and converts the input image signal Din in series from a graphic controller (not shown) to output each bit of the input image signal Din in parallel through different data transmission lines (not shown). For example, when the input image signal Din is 8 bits, 8 data transmission lines are needed. Further, if different data transmission lines are used according to the colors of the pixels, 24 data transmission lines are needed to represent the three red, green, and blue colors.

Hereafter, all image signals including the input image signals will be described as corresponding to the pixels. For example, when the pixels are arranged in a matrix shape, the image signals thereof will be described as being arranged in a matrix shape. Further, "the input image signals of one row" will be used to refer to "the input image signals for the pixels of one row".

The first input section 711 outputs the input image signals Din of one row as a group to one output terminal, and sequentially outputs the input image signals Din of the other rows through the plurality of output terminals. For example, as shown in FIG. 5, when there are 4 output terminals, if the input image signals Din of the k-th row are output through the first output terminal, the input image signals Din of the (k+1) th row are output through the second output terminal, and the input image signals Din of the (k+2)th row and the input image signals Din of the (k+3)th row are respectively output through the third and fourth output terminals. The input image signal Din input to first input section 711 is divided by the data enable signal DE in a row.

Each of the row memories 712, 713, 714, and 715 is connected to an output terminal of the first input section 711, and each includes storage space for storing the input image signals Din of one row. The row memories 712, 713, 714, and 715 receive the input image signal Din from the first input section 711 according to a data clock signal (not shown) and store it.

The row memories 712, 713, 714, and 715 may be dual port memories, and the number of row memories 712, 713, 714, and 715 may be 4 as shown in FIG. 5. The row memories 712, 713, 714, and 715 may be disposed in a liquid crystal display of a high definition (HD) level. However, in a liquid crystal display of a FULL HD level where the input image signals Din of even and odd columns of one row are received through different interfaces and are transmitted through different data transmission lines, a total of 48 data transmission lines and 8 row memories may be needed.

The first and second output sections 716 and 717 are connected to the row memories 712, 713, 714, and 715. The first output section 716 simultaneously reads the input image signals Din from two of the neighboring row memories 712, 713, 714, and 715 and outputs them. After reading two of the row memories 712, 713, 714, and 715, the first output section 716 reads the remaining two memories of the row memories 712, 713, 714, and 715 and outputs them. The second output section 717 sequentially reads the row memories 712, 713, 714, and 715 one by one and outputs the stored input image signals Din.

The first converter 720 receives input image signals Din of two rows from the first output section 716 and compresses them during two periods of the data enable signal DE to generate the compressed image signal Dcomp. On the other hand, the input image signals Din of the next two rows may be written to two of the row memories 712, 713, 714, and 715 during this period.

The input image signals Din for pixels PX of a 2×2 matrix disposed in two rows are defined as one block, and the compressed image signals Dcomp and the restoration image signals Drest thereof of each block are generated as one unit.

In each block, the compressed image signals Dcomp(p,q) of a p row and a q column may be represented by Equation 3 as follows:

$$Dcomp(p,q)=Din(p,q)-Dref(p,q)(p,q=1,2), \quad (3)$$

where, Din(p,q) is an input image signal of a p row and a q column, and Dref(p,q) is a compression reference image signal of a p row and a q column.

The compression reference image signal Dref may be changed according to the position of a corresponding block and the position of a corresponding pixel in each block.

In the first block BLc1 of each block, the compression reference image signal Dref for the compressed image signal Dcomp of row 1 and column 1 may be a predetermined value. For example, when an image signal of 8 bits is used, the value may be 128 which is a center value among the range of values (e.g., 0-255) that 8 bits can represent. The compressed image signal $[Dcomp(1,1)]_{BLc1}$ of row 1 and column 1 in a first block BLc1 may be determined according to Equation 4 as follows:

$$[Dcomp(1,1)]_{BLc1}=[Din(1,1)]_{BLc1}-C \text{ (C is a fixed value)}, \quad (4)$$

where C may be 128.

The compression reference image signals Dref for the remaining pixels excepting row 1 and column 1 in the first block BLc1 may be a restoration image signal Drest or a calculated signal thereof of different pixels in the block. For example, the compression reference image signal Dref of row 1 and column 2 may be the restoration image signal Drest of row 1 and column 1, and the compression reference image signal Dref of row 2 and column 1 may be the restoration image signal Drest of row 1 and column 1. Further, the compression reference image signal Dref of row 2 and column 2 may be defined as the average of the restoration image signal Drest of row 1 and column 2 and the restoration image signal Drest of row 2 and column 1. The compression reference image signals Dref may be represented by Equation 5 as follows:

$$[Dcomp(1,2)]_{BLc1}=[Din(1,2)]_{BLc1}-[Drest(1,1)]_{BLc1}$$

$$[Dcomp(2,1)]_{BLc1}=[Din(2,1)]_{BLc1}-[Drest(1,1)]_{BLc1}$$

$$[Dcomp(2,2)]_{BLc1}=[Din(2,2)]_{BLc1}-\{[Drest(1,2)]_{BLc1}+Drest(2,1)]_{BLc1}\}/2. \quad (5)$$

In the remaining blocks BL excepting the first block BLc1, the compression reference image signal Dref of row 1 and column 1 may be one of the restoration image signals Drest of the previous block in the same block row. The compression reference image signal Dref for row 1 and column 1 may be represented by Equation 6 as follows:

$$Dcomp(1,1)=Din(1,1)-[Drest(1,2)]_{cpre}, \quad (6)$$

wherein the script "cpre" represents the previous block of the same block row.

In the remaining blocks BL excepting the first block BLc1, the compression reference image signals Dref of the remaining pixels excepting row 1 and column 1 may be defined the same as was determined in the first block BLc1.

The compression image signals Dcomp in each block BL may be represented by Equation 7 as follows.

$$Dcomp(1,1)=Din(1,1)-Dref(1,1)$$

$$Dcomp(1,2)=Din(1,2)-Drest(1,1)$$

$$Dcomp(2,1)=Din(2,1)-Drest(1,1)$$

$$Dcomp(2,2)=Din(2,2)-[Drest(1,2)+Drest(2,1)]/2. \quad (7)$$

However, Dref(1,1)=C in each block row when the first block BLc1, and BL Dref(1,1)=$[Drest(1,2)]_{cpre}$ for the remaining blocks.

A time of four periods of the data clock signal is given to the compression of a pixel block because the first converter 720 compresses the input image signal (Dk, Dk+1) of 2 rows during two periods of the data enable signal DE to generate the compressed image signal Dcomp.

The first converter 720 uses the row memories 712, 713, 714, and 715 to extend the compression time by two times per each block such that sufficient time may be available for generating the compressed image signals Dcomp .

The buffer memory 721 is connected to the output terminal of the first converter 720, and the compressed image signal Dcomp passes through the buffer memory 721 and is stored in the frame memory 740. However, the buffer memory 721 may be omitted.

The frame memory controller 730 controls the frequency of the compressed image signals Dcomp output from the buffer memory 721 to the frame memory 740, and controls the frequency of the compressed image signal Dcomp_pre of the previous frame stored in the frame memory 740 to output it. The frame memory 740 may be a dual port memory.

The compressed image signal Dcomp_pre of the previous frame is transmitted from the frame memory 740 to the second converter 750 through the buffer memory 751. However, the compressed image signal Dcomp_pre may transmitted directly from the frame memory 740 to the second converter 750, thereby allowing the buffer memory 751 to be omitted. The buffer memories 721 and 751 may be dual port memories.

The second converter 750 restores the compressed image signal Dcomp_pre of the previous frame from the buffer memory 751 to generate the restoration image signal Drest_pre of the previous frame. The restoration of the second converter 750 is executed during the time that the first converter 720 generates the compressed image signal Dcomp and the restoration image signal Drest of the current frame for the same pixel row. The restoration image signal Drest_pre has the same bit number as that of the input image signal Din.

The first calculator 760 receives the restoration image signals Drest for the current frame from the first converter 720 and the restoration image signals Drest_pre for the previous frame from the second converter 750 to calculate the differences between the restoration image signals Drest_pre of the previous frame and the restoration image signals Drest of the current frame, and the differences are sequentially output as difference signals ΔDrest.

The second storage unit 770 includes a second input section 771, a plurality of row memories 772, 773, 774, and 775, and a third output section 776.

The second input section 771 includes an input terminal and a plurality of output terminals. The second input section 771 receives the difference signals ΔDrest from the first calculator 760 and groups the difference signals ΔDrest for each row. The grouped difference signals ΔDrest for each row are sequentially output through respective output terminals.

Each of the row memories 772, 773, 774, and 775 is connected to an output terminal of the second input section 771, and stores the difference signals ΔDrest of a row. The number of row memories 772, 773, 774, and 775 is the same as the number of row memories 712, 713, 714, and 715 of the first storage unit 710, and the row memories 772, 773, 774, and 775 may be single port memories.

The third output section 776 is connected to the row memories 772, 773, 774, and 775, and sequentially reads the row memories 772, 773, 774, and 775 to output the stored difference signals ΔDrest.

The second calculator 780 sums the difference signals ΔDrest input from the third output section 776 and the input image signal Din input from the second output section 717 to generate a second restoration image signal Drest2 of the previous frame. The second restoration image signal Drest2 of the previous frame is determined by Equation 8 as follows:

$$Drest2=(Drest\_pre-Drest)+Din. \quad (8)$$

The DCC processor 790 compensates the input image signal Din of the current frame received from the second output section 717 based on the second restoration image signal Drest2 of the previous frame received from the second calculator 780 to generate the compensation image signal Dmod of the current frame.

If a voltage is applied to both ends of the liquid crystal capacitor Clc, the liquid crystal molecules of the liquid crystal layer 3 are realigned to a stable state corresponding to the voltage. However, since the response speed of the liquid crystal molecules is relatively low, it can take some time to reach the stable state. If the voltage to be applied to the liquid crystal capacitor Clc is maintained, the liquid crystal molecules continue to move until they reach the stable state and light transmittance changes. If the liquid crystal molecules reach the stable state and do not move anymore, light transmittance becomes constant.

A pixel voltage in the stable state is referred to as a "target pixel voltage". When the pixel voltage is in the stable state, light transmittance is referred to as "target light transmittance". The target pixel voltage and the target light transmittance have a one-on-one correspondence relationship.

However, since the switching element Q of each pixel PX is turned on and a time for applying the data voltage is limited, the liquid crystal molecules rarely reach the stable state during application of the data voltage. When the switching element Q is turned off, a difference in voltage at both ends of the liquid crystal capacitor Clc still exists, and the liquid crystal molecules continue to move toward the stable state. When the alignment state of the liquid crystal molecules changes, the dielectric constant of the liquid crystal layer 3 changes, and thus capacitance of the liquid crystal capacitor Clc changes. When the switching element Q is turned off, one terminal of the liquid crystal capacitor Clc is in a floating state. If a leakage current is not taken into account, the total charges accumulated in the liquid crystal capacitor Clc remain constant. A change in capacitance of the liquid crystal capacitor Clc is accompanied by a change in voltage (e.g., a change in pixel voltage) between both ends of the liquid crystal capacitor Clc.

When the data voltage (hereinafter referred to as "target data voltage") corresponding to the target pixel voltage is applied to the pixel PX, the target transmittance cannot be obtained because an actual pixel voltage is different from the target pixel voltage. As the target transmittance becomes more and more different from the original transmittance of the pixel PX, a difference between the actual pixel voltage and the target pixel voltage becomes larger.

The data voltage to be applied to the pixel PX can be made larger or smaller than the target data voltage. For example, a DCC (dynamic capacitance compensation) method can be used to make the data voltage larger or smaller.

The compensation image signal Dmod of the current frame generated from the DCC processor 790 may be represented as function F1 in Equation 9 as follows:

$$Dmod=F1(Din, Drest2). \quad (9)$$

Hereafter, the input image signal Din of the current frame is referred as "a current image signal", and the second restoration image signal Drest2 of the previous frame is referred as to "a previous image signal".

The compensation image signal Dmod may be determined by experimental results. The difference between the compensation image signal Dmod and the previous image signal Drest2 may be more than the difference between the current image signal Din before the compensation and the previous image signal Drest2. When the current image signal Din is the same as the previous image signal Drest2, or the difference between the two is small, the compensation image signal Dmod may become the same as the current image signal Din (i.e., may be not compensated). The signal compensation causes the data voltage applied to the pixel PX to become larger or smaller than the target data voltage.

Table 1 is an example of previous image signals Drest2 and compensation image signals Dmod of a current image signal Din for a pair of current image signals Din when the number of grays is 256. Table 1 may be stored in a lookup table and is illustrated as follows:

TABLE 1

| | | Din | | | | | | | | |
|---|---|---|---|---|---|---|---|---|---|---|
| | | 0 | 32 | 64 | 96 | 128 | 160 | 192 | 224 | 255 |
| Drest2 | 0 | 0 | 0 | 0 | 0 | 0 | 0 | 0 | 0 | 0 |
| | 32 | 115 | 32 | 22 | 20 | 15 | 15 | 15 | 15 | 15 |
| | 64 | 169 | 103 | 64 | 50 | 34 | 27 | 22 | 20 | 16 |
| | 96 | 192 | 146 | 118 | 96 | 87 | 70 | 54 | 36 | 29 |
| | 128 | 213 | 167 | 156 | 143 | 128 | 121 | 105 | 91 | 70 |
| | 160 | 230 | 197 | 184 | 179 | 174 | 160 | 157 | 147 | 129 |
| | 192 | 238 | 221 | 214 | 211 | 205 | 199 | 192 | 187 | 182 |
| | 224 | 250 | 245 | 241 | 240 | 238 | 238 | 224 | 224 | 222 |
| | 255 | 255 | 255 | 255 | 255 | 255 | 255 | 255 | 255 | 255 |

A larger lookup table would be required if the compensation image signals Dmod for all pairs Drest2 and Din of the previous and the current image signals were stored. However, a smaller lookup table, such as Table 1, can be used if a fewer number of the compensation image signals Dmod for previous and current image signal pairs Drest2, Din are stored and restored as reference compensation image signals. The remaining previous and current image signal pairs Drest2, Din can be calculated using an interpolation method based on the reference compensation image signal to obtain the compensation image signal Dmod. A remaining previous and current image signal pair Drest2, Din can be interpolated by searching the reference compensation image signals for the image signal pair Drest2, Din of Table 1 nearest the corresponding image signal pair Drest2, Din and obtaining the compensation image signal Dmod for the corresponding image signal pair Drest2, Din based on the searched reference compensation image signals.

For example, an image signal, which is a digital signal, is divided into a high bit and a low bit. A reference compensation image signal for the previous image signal and the current image signal pair Drest2, Din in which a low bit thereof is 0 is stored in a lookup table. After related reference compensation image signals are found in a lookup table based on a high bit thereof for a remaining previous and current image signal pair Drest2, Din, a compensation image signal Dmod is calculated using the reference compensation image signal that is found from the lookup table and a low bit of previous and current image signals Drest2, Din.

A target transmittance may alternatively be obtained by applying a voltage to liquid crystal molecules in a present frame after liquid crystal molecules are inclined (hereinafter referred to as a "pretilt") with a middle magnitude of the voltage that is provided beforehand in a previous frame.

In a highest gray or a lowest gray among grays in which an image signal can be displayed, the image signal and the data voltage may be compensated or not. An image signal may be compensated in the highest gray or the lowest gray by widening a gray voltage range that the gray voltage generator 550 can generate wider than a range of the target data voltage that is required for obtaining a target luminance range (or a target transmittance range) in which all grays are displayed.

The signal controller 600 appropriately processes the compensation image signal Dmod received from the DCC processor 790 depending on an operating condition of the liquid crystal panel assembly 300, and outputs it to the data driver 500 as a digital output image signal DAT.

An operation of the signal processor 700 will be described in detail with reference to FIG. 6. In FIG. 6, the numbers in parentheses of each signal Din, ΔDrest represent row numbers.

The input image signals Din of a one pixel row by one pixel row are sequentially written to the row memories 712, 713, 714, and 715 of the first storage unit 710 during a first period T1. One period of the data enable signal DE is needed for writing the input image signals Din of one row to the row memory, and 4 periods of the data enable signal DE are needed to write the input image signals Din to the row memories 712, 713, 714, and 715.

When the writing of the input image signals Din to the third row memory 714 is started, the first converter 720 starts to read the input image signals Din of the first and second row memories 712 and 713. The first converter 720 generates the compressed image signals Dcomp and the restoration image signals Drest for the two rows and outputs them during two periods of the data enable signal DE (i.e., the period that the input image signals Din are written to the third and fourth row memories 714 and 715).

On the other hand, during the time that the first converter 720 generates and outputs the compressed image signals Dcomp for two pixel rows, the second converter 750 reads the compressed image signals Dcomp_pre of the previous frame for two pixel rows from the frame memory 740 to generate the restoration image signals Drest_pre and output them.

The first calculator 760 subtracts the restoration image signal Drest of the current frame from the restoration image signals Drest_pre of the previous frame to generate the difference signal ΔDrest, and two of the row memories 772, 773, 774, and 775 among the second storage unit 770 write the difference signal ΔDrest for a respective row.

When the second period T2 is started, the input image signal Din(5) of the next row is written to the first row memory 712 of the first storage unit 710 through a port, and the input image signals Din(3) and Din(4) that are stored the third and fourth row memories 712 and 713, respectively, through a different port is simultaneously read. The difference signal ΔDrest(1) that is stored in the first row memory 772 of the second storage unit 770 may be read simultaneously.

The second restoration image signal Drest(2) is obtained through the difference signal ΔDrest(1) and the input image signal Din(1). The input image signal Din(1) is DCC compensated based on the second restoration image signal Drest (2).

When four of the row memories 712, 713, 714, and 715 are used, a sufficient time corresponding to 4 periods of the data enable signal DE is given to generate and output the compressed image signal Dcomp and the restoration image signal Drest from the input image signal Din.

On the other hand, in a FULL HD liquid crystal display, the time corresponding to the two periods of the data enable signal DE may be obtained for the compression and the restoration by respectively using the eight row memories of the first and second storage units 710 and 770.

A liquid crystal display to compress and restore without a time limit and reduce the number of row memories used in the signal process of FIG. 3 will be described in detail with reference to FIG. 7 and FIG. 8.

Figure 7:
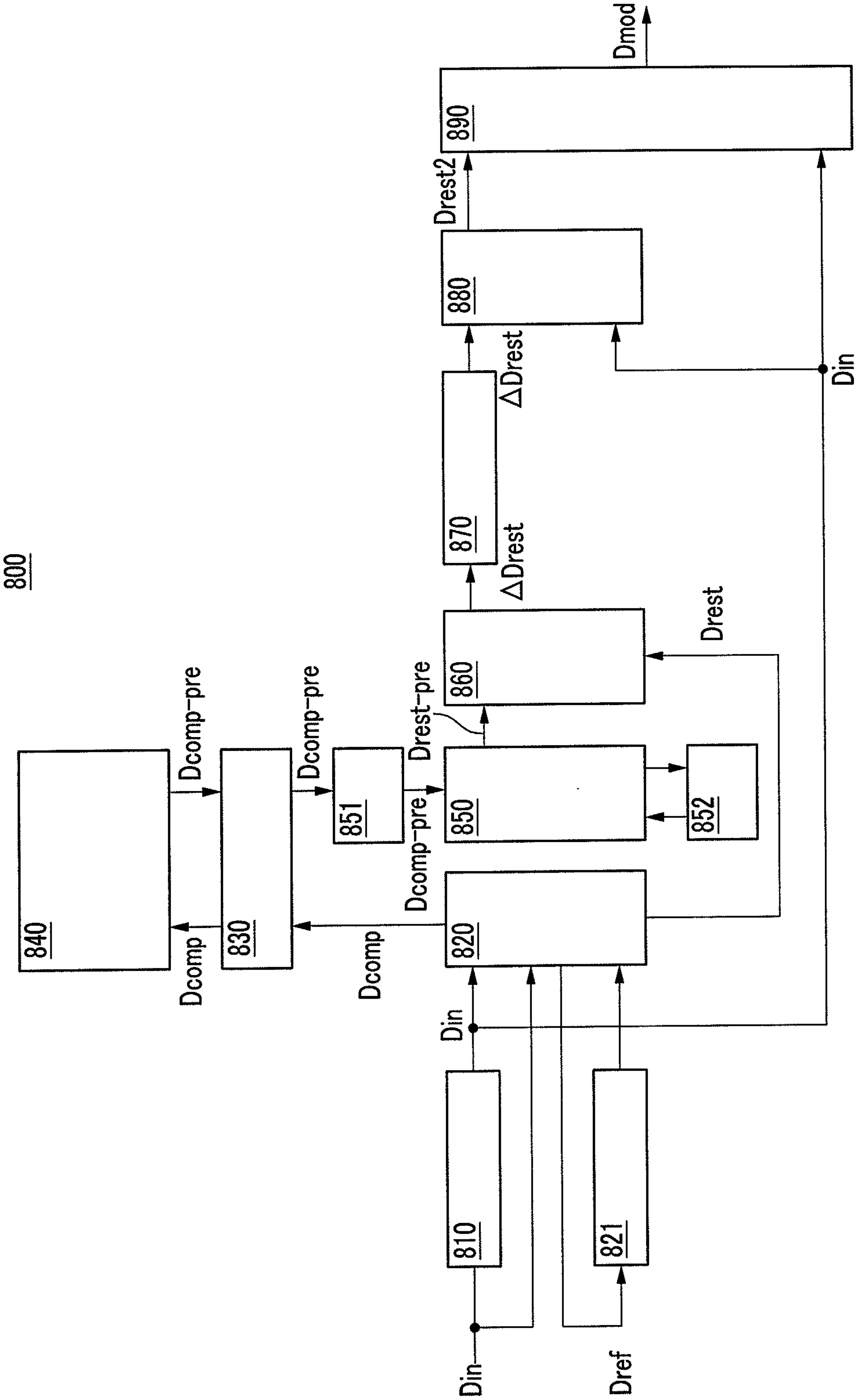
FIG. 7 is a block diagram of a signal processor in a liquid crystal display according to an exemplary embodiment of the present invention.
Figure 8:
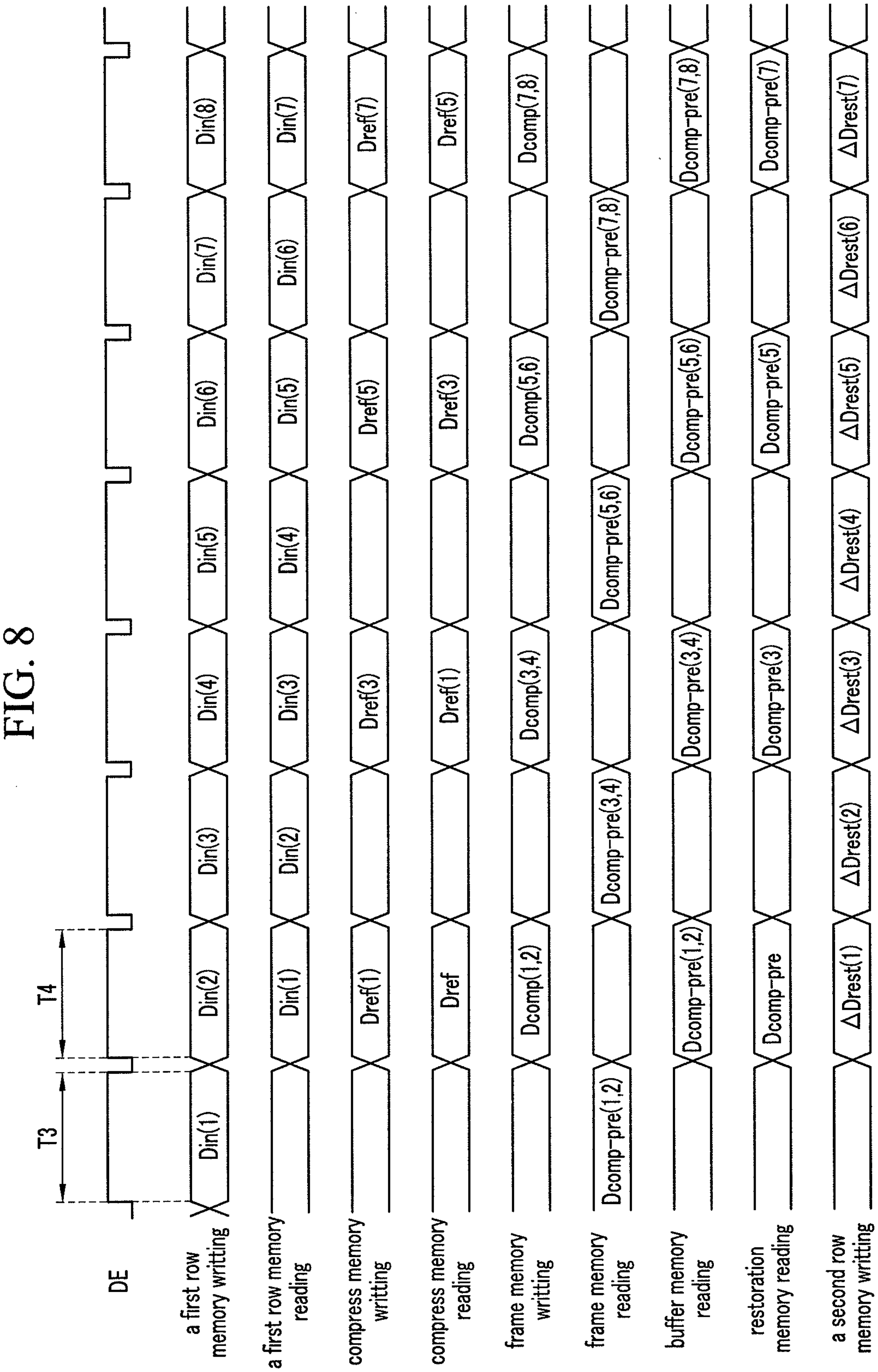
FIG. 8 is a signal waveform diagram used for explaining an operation of the signal processor shown in FIG. 7.

FIG. 7 is a block diagram of a signal processor in a liquid crystal display according to an exemplary embodiment of the present invention, and FIG. 8 is a signal waveform diagram used for explaining an operation of the signal processor shown in FIG. 7.

Referring to FIG. 7, the signal processor 800 includes a first row memory 810, a compression memory 821, a first converter 820, a frame memory 840, a frame memory controller 830, a second converter 850, a restoration memory 852, a first calculator 860, a second row memory 870, a second calculator 880, a DCC processor 890, and a buffer memory 851.

The first row memory 810 has storage space for storing input image signals Din for a pixel row, receives the input image signals Din of a row based on the data clock signal, stores them during a period of the data enable signal DE, and then outputs them to the first converter 820 and the DCC processor 890. The first row memory 810 may be a dual port memory.

The compression memory 821 has a storage space corresponding to half of the first row memory 810, and stores a portion of the restoration image signal $D_{k-1}$ of the previous block row as a compression reference image signal Dref. The compression memory 821 may be a single port memory.

The first converter 820 receives the input image signals Din of the first row from the first row memory 810, the input image signals Din of the second row from an external source, and the compression reference image signals Dref from the compression memory 821.

The first converter 820 uses the DCPM compression method defined by Equation 1 to generate the compressed image signals Dcomp and the restoration image signals Drest.

The compression reference image signals Dref may be changed according to the position of the row that includes the corresponding block BL and the position of the corresponding pixel in each block BL in the block matrix arranged as shown in FIG. 4. The compression reference image signals Dref may be represented by Equation 10 as follows:

$$D\text{comp}(1,1)=D\text{in}(1,1)-D\text{ref}(1,1)$$

$$D\text{comp}(1,2)=D\text{in}(1,2)-D\text{rest}(1,1)$$

$$D\text{comp}(2,1)=D\text{in}(2,1)-D\text{rest}(1,1)$$

$$D\text{comp}(2,2)=D\text{in}(2,2)-[D\text{rest}(1,2)+D\text{rest}(2,1)]/2. \quad (10)$$

In each block BLr1 of the first block row, Dref(1,1) may be a predefined value. For the remaining blocks, Dref(1,1) may be equal to $[\text{Drest}(2,1)]_{rpre}$ (the script "rpre" represents the previous block in the same block column). However, Dref(1, 1) may be equal to $[\text{Drest}(p,q)]_{pre}$, and p and q may be a random combination among 1 and 2.

The compressed image signals Dcomp of row 1 and column 1 in each block BL may be obtained by using the restoration image signals Drest of the previous block row as the compression reference image signals Dref. The time for generating the compression reference image signals Dref is sufficent because the compression reference image signals Dref are made and stored to the compression memory 821 before the input image signals Din of the corresponding row are received.

A portion of the restoration image signals Drest are output and stored to the compression memory 821 as the compression reference image signals Dref for the next block row, and the compressed image signals Dcomp are stored to the frame memory 840 and are output as the previous image signal at the next frame.

The frame memory 840 stores compressed image signals Dcomp_pre for the previous frame. The frame memory controller 830 controls the frequency of the compressed image signals Dcomp input from the first converter 820 to transmit them to the frame memory 840, and controls the frequency of the compressed image signals Dcomp_pre of the previous frame stored to the frame memory 840 to transmit them to the buffer memory 851.

The buffer memory 851 receives the compressed image signals Dcomp_pre of the previous frame from the frame memory 840, stores them for a time, and outputs them to the second converter 850. The buffer memory 851 may be a single port SDRAM (synchronous dynamic random access memory).

The second converter 850 receives the compressed image signals Dcomp_pre of the previous frame from the buffer memory 851, and restores them according to the compression reference image signals Dref_pre from the restoration memory 852 to generate the restoration image signals Drest_pre of the previous frame.

The restoration memory 852 stores the compression reference image signals Dref_pre of the previous frame, outputs them to the second converter 850, and receives a portion among the restoration image signals Drest_pre of the previous frame from the second converter 850 to store them as the compression reference image signals Dref_pre for the next block row. The restoration memory 852 may be a single port memory.

The first calculator 860 simultaneously receives the restoration image signals Drest for the current frame from the first converter 820 and the restoration image signals Drest_pre for the previous frame from the second converter 850, calculates the differences between the restoration image signals Drest_pre for the previous frame and the restoration image signals Drest for the current frame, and sequentially outputs them as difference signals ΔDrest.

The second row memory 870 receives and stores the difference signals ΔDrest from the first calculator 760. The second row memory 870 may be a single port memory.

The second calculator 880 sums the difference signals ΔDrest of the restoration image signals of the previous and current frames for a pixel row and the input image signals Din from the first row memory 810 to generate second restoration image signals Drest2 of the previous frame.

The DCC processor 890 compensates the input image signals Din of the current frame received from the first row memory 810 based on the second restoration image signals Drest2 of the previous frame received from the second calculator 880 to generate compensation image signals Dmod of the current frame.

An operation of the signal processor shown in FIG. 7 will be described in detail with reference to FIG. 8. In FIG. 8, the numbers in parentheses of each signal Din, ΔDrest represent row numbers.

The input image signals Din for the first row are stored to the first row memory 810 during a first period T3.

When the second period T4 following the first period T3 is started, the input image signals Din for the second row are stored to the first row memory 810 and are simultaneously input to the first converter 820, and the first converter 820 reads the input image signals Din stored to the first row memory 810 for the first row.

The first converter 820 generates the compressed image signals Dcomp and the restoration image signals Drest for two rows based on the compression reference image signals Dref stored in the compression memory 821. The generated compressed image signals Dcomp are stored to the frame memory 840, and the restoration image signals Drest are transmitted to the first calculator 860. A portion of the restoration image signals Drest are written to the compression memory 821 as the compression reference signals Dref for the next block row.

Since a bit count of the compressed image signals Dcomp is less than a bit count of the input image signals Din, the number of data transmission lines required for transmitting them is less. For example, if the bit count of the compressed image signals Dcomp is half of the bit count of the input image signals Din, 24 data transmission lines are required to transmit the compressed image signals Dcomp for two rows.

On the other hand, the frame memory controller 830 reads the compressed image signals Dcomp_pre of the previous frame for the first and second pixel rows from the frame memory 840 and writes them to the buffer memory 851 during the first period T3.

The second converter 850 reads the compressed image signals Dcomp_pre of the previous frame for two pixel rows from the buffer memory 851 during the second period T4, and the compression reference image signals Dref_pre for the corresponding compression block from the restoration memory 852 by restoring the compressed image signals Dcomp_pre to generate the restoration image signals Drest_pre.

A portion of the restoration image signals Drest_pre is stored to the restoration memory 852 as compression reference image signals Dref_pre for the restoration of the next row.

The first calculator 860 subtracts the restoration image signals Drest of the current frame received from the first converter 820 from the restoration image signals Drest_pre of the previous frame received from the second converter 850 to generate difference signals ΔDrest and writes them to the second row memory 870.

The restoration image signals Dref of a previous row are used as compression reference image signals Dref on compressing such that the number of row memories may be reduced, thereby reducing cost and space.

When the amounts of the memories except the frame memory and the buffer memory are compared, the signal processor of FIG. 5 requires 6 dual port memories and 4 single port memories, while the signal processor of FIG. 7 requires one dual port memory and one single port memory and the compression memory and the restoration memory take a half single port memory respectively. Accordingly, the signal processor of FIG. 7 may have a reduced memory capacity as compared to the signal processor of FIG. 5.

In each block BL, the compressed image signals Dcomp of row 1 and column 1 may be obtained by using the restoration image signal of the previous block row or the restoration image signals of the previous block column as the compression reference image signal, and the compressed image signals excepting row 1 and column 1 may be obtained by using the restoration image signals of the different pixels of the corresponding block as the compression reference image signals.

While the basic unit of a block for the compression and the restoration has been described as being a 2×2 pixel matrix, the present invention is not limited thereto. For example, the basic unit of the block may include various pixel matrix configuration. Preferably, the basic unit of the block is a square matrix. When basic unit of the block is a square matrix, the compressed image signals for at least one pixel (preferably only one pixel) in each block are generated based on the restoration image signal for the pixel of an adjacent block, and the compressed image signals for the remaining pixels are generated based on the restoration image signal for an adjacent pixel in its block. Further, the number of first and second row memories 810 and 870, and the sizes of the compression memory 821 and the restoration memory 852 may be changed.

While the signal processor 800 has been discussed as generating the DCC processed compensation image signals, the present invention is not limited thereto. For example, the signal processor 800 may execute different signals to generate the compensation image signal, and the compensation may be an ACC, a dithering, a gamma correction, or an impulsive compensation.

Having described exemplary embodiments of the present invention, it is to be understood that the invention is not limited to the disclosed embodiments, but, on the contrary, is intended to cover various modifications and equivalent arrangements included within the spirit and scope of the disclosure.

What is claimed is:

1. A driver for pixels of a display, the pixels arranged into a plurality of pixel blocks being in at least two rows and at least two columns, the driver comprising:
- a first converter receiving input image signals for a pixel block of the plurality of pixel blocks for a first frame, and generating compressed image signals by compressing the input image signals for the first frame based on both the input image signals for the first frame and compression reference image signals for the first frame;
- a frame memory storing the compressed image signals; and
- a second converter reading the compressed image signals from the frame memory, and restoring the compressed image signals based on the compression reference image signals to generate restoration image signals,
- wherein the compressed image signals are generated from the pixel block as a unit,
- wherein the compression reference image signal for compressing data for a first pixel in a first pixel block is the restoration image signal generated from performing a decompression on compressed data of a single second pixel in a neighboring second pixel block, and
- wherein the compression reference image signal for compressing data for a third pixel in the first pixel block is the restoration image signal generated from performing a decompression on compressed data of a single pixel in the first pixel block other than the third pixel.

2. The driver of claim 1, wherein the pixel block is a square shaped pixel matrix.

3. The driver of claim 1, wherein the first pixel block is adjacent the second pixel block and does not overlap the second pixel block.

4. The driver of claim 1, wherein the compressed image signals are generated by subtracting the compression reference image signals from the input image signals.

5. The driver of claim 3, wherein the first and second pixel blocks are adjacent one another in a row direction.

6. The driver of claim 3, wherein the first and second pixel blocks are adjacent one another in a column direction.

7. The driver of claim 1, further comprising a signal compensator compensating the restoration image signals.

8. A driving device for a display device, comprising:

a first storage unit receiving input image signals sequentially transmitted according to a clock signal, storing the input image signals for at least four pixel rows, and simultaneously outputting the input image signals for at least two pixel rows;

a first converter compressing the input image signals for a first frame received from the first storage unit on the basis of both the input image signals for the first frame and first compression reference image signals for the first frame to generate compressed image signals, and restoring the compressed image signals to generate first restoration image signals;

a frame memory storing the compressed image signals; and a second converter reading the compressed image signals from the frame memory, and restoring the compressed image signals for the first frame on the basis of both the compressed image signals for the first frame and second compression reference image signals for the first frame to generate second restoration image signals, wherein the first compression reference image signals for compressing data for the first frame are data resulting from performing a decompression on compressed data of the first frame, wherein the first converter compresses one of the input signals for a first pixel of the first frame using one of the first compression reference signals resulting from performing a decompression on compressed data for a second other pixel of the same first frame.

9. The driving device of claim 8, wherein the time for compressing the input image signals through the first converter is greater than one period of the clock signal.

10. The driving device of claim 9, wherein the first storage unit includes:

a first input section grouping the input image signals externally input in series row by row to sequentially output the input image signals to a plurality of output terminals;

first, second, third, and fourth row memories respectively connected to the output terminals of the input section, and respectively storing the input image signals of one row; and a first output section simultaneously outputting the input image signals stored in the first and second row memories, and simultaneously outputting the input image signals stored in the third and fourth row memories.

11. The driving device of claim 10, wherein the first storage unit further includes a second output section sequentially outputting the input image signals stored in the first to fourth row memories, the driving device further comprising:

a first calculator calculating differences between the first restoration image signals and the second restoration image signals to generate difference signals;

a second calculator generating second restoration image signals on the basis of the difference signals and the input image signals received from the second output section; and a signal compensator compensating the input image signals received from the second output section on the basis of the second restoration image signals.

12. The driving device of claim 11, further comprising a second storage unit receiving and storing the difference signals from the first calculator, outputting to the second calculator, and including row memories of four units.

13. The driving device of claim 12, wherein the compressed image signals are generated by each pixel block as a unit, the pixel block is defined as a pixel matrix including at least two pixel rows and at least two pixel columns, the first compression reference image signals for one pixel among the pixels included in the pixel block are first restoration image signals for one pixel included in the neighboring pixel block in a row direction, and first compression reference image signals for the remaining pixels are the first restoration image signals for different pixels in the corresponding pixel block or the signals calculated by the first restoration image signals.

14. A driving method for a display device comprising:

receiving input image signals for a plurality of pixels arranged in a matrix shape for a first frame;

generating compressed image signals by compressing the input image signals for the first frame on the basis of both the input image signals for the first frame and first compression reference image signals for the first frame and generating first restoration image signals by restoring the compressed image signals for the first frame;

storing the compressed image signals; and generating second restoration image signals by restoring the stored compressed image signal on the basis of second compression reference image signals, wherein the compressed image signals are generated by a pixel block unit, wherein the pixel block includes at least two pixel rows and at least two pixel columns, wherein the first compression reference image signal for compressing data for a first pixel in a first pixel block is the first restoration image signal generated from performing a decompression on compressed data of a single second pixel in a neighboring second pixel block, and wherein the first compression reference image signals for compressing data for a third pixel in the first pixel block is the first restoration image generated from performing a decompression on compressed data of a single pixel in the first pixel block other than the third pixel.

15. The driving method of claim 14, wherein the pixel block is a pixel matrix of a square shape.

16. The driving method of claim 14, wherein the first pixel block is adjacent the second pixel block and does not overlap the second pixel block.

17. The driving method of claim 14, wherein the compressed image signals are the signals that are generated by subtracting the first compression reference signals from the input image signals.

18. The driving method of claim 14, wherein the first and second blocks are adjacent one another in a row direction.

19. The driving method of claim 18, wherein the generating of the compressed image signals and the first restoration image signals includes sequentially storing the input image signals transmitted with a first frequency to a plurality of row memories, and generating the compressed image signals and the first restoration image signals for the input image signals of two rows by simultaneously reading the input image signals of the two rows from the plurality of row memories with a second frequency that is half of the first frequency.

20. A driver for pixels of a display, the pixels arranged into a plurality of pixel blocks comprising at least four pixels in at least two rows and at least two columns, the driver comprising:

a first converter;

a second converter; and a frame memory, wherein the first converter compresses a first image signal for a first pixel of a pixel block of the plurality of pixel blocks based on a first reference signal to generate a first compressed image signal for storage in the frame memory, wherein the second converter reads the first compressed image signal from the frame memory and generates a first restoration image signal from the first compressed image signal and the first reference signal, wherein the first converter compresses a second image signal for a second pixel of the pixel block based on the first restoration image signal to generate a second compressed image signal for storage in the frame memory, wherein the first converter compresses a third image signal for a third pixel of the pixel block based on the first restoration image signal to generate a third compressed image signal for storage in the frame memory, wherein the second converter reads the second and third compressed image signals from the frame memory, generates a second restoration image signal from the second compressed image signal and the first restoration image signal, generates a third restoration image signal from the third compressed image signal and the first restoration image signal, and wherein the first converter compresses a fourth image signal for a fourth pixel of the pixel block based an average of the second and third restoration image signals.

* * * * *